US009628921B2

(12) United States Patent
Kropp et al.

(10) Patent No.: US 9,628,921 B2
(45) Date of Patent: Apr. 18, 2017

(54) OPTICAL MICROPHONE AND METHOD USING THE SAME

(71) Applicant: THOMSON LICENSING, Issy de Moulineaux (FR)

(72) Inventors: Holger Kropp, Wedemark (DE); Jens Spille, Hemmingen (DE); Malte Borsum, Hannover (DE)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/740,177

(22) Filed: Jun. 15, 2015

(65) Prior Publication Data
US 2015/0365753 A1 Dec. 17, 2015

(30) Foreign Application Priority Data

Jun. 17, 2014 (EP) .................................... 14305921

(51) Int. Cl.
H04R 23/00 (2006.01)
H04R 1/08 (2006.01)
(Continued)

(52) U.S. Cl.
CPC ............. *H04R 23/008* (2013.01); *G01H 9/00* (2013.01); *H04R 1/08* (2013.01); *H04R 7/06* (2013.01);
(Continued)

(58) Field of Classification Search
CPC ... H04R 7/02; H04R 7/04; H04R 7/06; H04R 7/10; H04R 23/008; H04R 2307/023;
(Continued)

(56) References Cited

U.S. PATENT DOCUMENTS 3,286,032 A * 11/1966 Baum ..................... H03M 1/00
341/9
4,422,182 A * 12/1983 Kenjyo ................ H04R 23/008
381/172
(Continued)

FOREIGN PATENT DOCUMENTS

DE 19809920 C1 12/1999
DE 102009056296 6/2011
(Continued)

OTHER PUBLICATIONS

Mukherjee et al, "Broadband wavelength-selective reflectance and selective polarization by a tip-bent vertically aligned multi-walled carbon nanotube forest", May 13, 2014, Journal of Physics D: Applied Physics, pp. 1-7.*
(Continued)

*Primary Examiner* — Curtis Kuntz
*Assistant Examiner* — Joshua Kaufman
(74) *Attorney, Agent, or Firm* — Volpe and Koenig, P.C.

(57) ABSTRACT

An optical microphone comprises a light source configured to emit a light beam and an acoustic sensor configured to reflect the light beam. The acoustic sensor includes single-wall nanotubes and deflects in response to pressure waves. An optional reflector of the optical microphone is configured to re-reflect the light beam from the acoustic sensor. A detector is configured to detect the light beam from the acoustic sensor or the reflector, and thus measures the pressure waves.

17 Claims, 3 Drawing Sheets

(51) Int. Cl.
*H04R 7/06* (2006.01)
*G01H 9/00* (2006.01)

(52) U.S. Cl.
CPC .. *H04R 2307/023* (2013.01); *H04R 2307/029* (2013.01)

(58) Field of Classification Search
CPC ........ H04R 2307/025; H04R 2307/027; H04R 2307/029; B82Y 15/00; B82Y 20/00; G10H 9/00
See application file for complete search history.

(56) References Cited

U.S. PATENT DOCUMENTS

| | | | |
|---|---|---|---|
| 5,200,610 A | 4/1993 | Zuckerwar et al. | |
| 5,262,884 A * | 11/1993 | Buchholz | H04B 10/11 381/172 |
| 5,621,806 A * | 4/1997 | Page | H04R 23/008 381/172 |
| 6,154,551 A * | 11/2000 | Frenkel | H04R 23/008 381/160 |
| 6,349,791 B1 * | 2/2002 | Glenning | G10K 11/006 181/139 |
| 7,995,777 B2 * | 8/2011 | Yu | B06B 1/0688 381/190 |
| 8,072,609 B1 * | 12/2011 | Trivedi | G01D 5/266 356/486 |
| 2007/0292896 A1 * | 12/2007 | Strano | B82Y 15/00 435/7.9 |
| 2009/0045005 A1 * | 2/2009 | Byon | H04R 7/02 181/167 |
| 2009/0123112 A1 | 5/2009 | Kahana et al. | |
| 2010/0034413 A1 * | 2/2010 | Chang | H04R 23/008 381/355 |
| 2010/0095786 A1 * | 4/2010 | Imholt | G01L 5/0052 73/862.68 |
| 2011/0096952 A1 * | 4/2011 | Wang | H04R 7/125 381/386 |
| 2013/0096367 A1 * | 4/2013 | Easter | A61F 11/045 600/25 |
| 2014/0064530 A1 * | 3/2014 | Maier | H04R 25/606 381/322 |
| 2014/0321026 A1 * | 10/2014 | Hermann | C01B 31/0226 361/502 |
| 2015/0365753 A1 * | 12/2015 | Kropp | H04R 1/08 381/172 |

FOREIGN PATENT DOCUMENTS

| | | |
|---|---|---|
| DE | 102010000392 | 8/2011 |
| JP | 200432425 | 1/2004 |
| WO | WO2013007645 | 1/2013 |

OTHER PUBLICATIONS

Cao et al., "Arrays of single-walled carbon nanotubes with full surface coverage for high-performance electronics", Jan. 27, 2013, Nature Nanotechnology, vol. 8, pp. 180-186.*
Mizuno et al: "A black body absorber from vertically aligned single-walled carbon nanotubes"; Jan. 29, 2009;Institute of Advanced Industrial Science and Technology;Japan; pp. 1-4.
Cubukcu et al: "Aligned carbon nanotubes as polarization sensitive molecular near field detectors"; Feb. 24, 2009;vol. 106, No. 8; pp. 2495-2499.
Saleh et al: "Transforming carbon nanotube forest from darkest absorber to reflective mirror"; Mar. 20, 2013; AIP; pp. 1-5.
Aliev et al: "Mirage Effect From Thermally Modulated Transparent Carbon Nanotube Sheets";Published Oct. 3, 2011; online at stacks. iop.org/Nano/22/435704; pp. 1-10.
Kizuka et al: "Young's Modulus of Single-Crystal Fullerence C70 Nanotubes"; Hindawi Publishing Corporation; Journal of Nanotechnology;vol. 2012, Article ID969357, pp. 1-6.
Yu et al: "Carbon nanotube-based transparent thin film acoustic actuators and sensors";available online at www.sciencedirect.com Apr. 17, 2006;Sensors and Actuators A 132 (2006); pp. 626-631.
Search Report Dated Aug. 1, 2014.

* cited by examiner

OPTICAL MICROPHONE AND METHOD USING THE SAME

This application claims the benefit, under 35 U.S.C. §119 of European Patent Application No. 14305921.0, filed Jun. 17, 2014.

FIELD OF THE INVENTION

The present invention relates to an optical microphone and a method using the same. More specifically, this invention relates to an optical microphone comprising an acoustic sensor which includes nanotubes and deflects in response to acoustic pressure waves.

BACKGROUND OF THE INVENTION

An optical microphone converts acoustic pressure waves into electrical signals by detecting light beams, instead of sensing changes in capacitance or magnetic fields as with conventional microphones. Since optical microphones do not react to electric and magnetic fields and are robust against heat and moisture, they are ideal for use in areas where conventional microphones are ineffective or dangerous to be used, such as industrial turbines or in magnetic resonance imaging (MRI) equipment environments.

An optical microphone includes generally a light source, an acoustic sensor such as a membrane having a reflective surface, optical transmitters such as optical fibers, and an optical detector. The light source emits a light beam, which is transmitted and guided by the transmitters to the acoustic sensor. The acoustic sensor is a sound-sensitive body that can detect acoustic pressure waves and reflect the light beam to the optical detector. Depending on the detected acoustic pressure waves, the acoustic sensor reflects the light beam with different properties, which are subsequently transformed into electric signals by the detector. The acoustic pressure waves can thus be analysed and measured.

Since the acoustic membrane in the optical microphone detects light beams rather than electric signals, the size of an optical microphone can be much smaller than the one of a conventional microphone. However, there are still demands for even smaller optical microphones to be used in specific conditions such as medical applications in human body.

In addition, since the oscillation pattern of the acoustic membrane is directly transmitted to the detector, the detection might be inaccurate and unreliable when the oscillation pattern of the membrane is fast and chaotic. In this case, it would be difficult to differentiate the real signals and the noise. There is a need to improve the signal-to-noise ratio (SNR) of the detection of an optical microphone.

SUMMARY OF THE INVENTION

Therefore, it is an objective of the present invention to propose an improved optical microphone and a method using the same.

A preferred embodiment of the optical microphone according to this invention comprises a light source configured to emit a light beam and an acoustic sensor configured to reflect the light beam emitted from the light source. The acoustic sensor includes parallel-aligned single-wall nanotubes and deflects in response to pressure waves. The parallel-aligned single-wall nanotubes are preferably in a form of an array. The optical microphone further comprises a detector configured to detect the light beam reflected by the acoustic sensor.

In one preferred embodiment of the invention, the optical microphone further comprises a reflector including multi-wall nanotubes and configured to re-reflect the light beam from the acoustic sensor. The detector is then configured to detect the re-reflected light beam from the reflector. The reflector is optionally a membrane reflector, on which multi-wall nanotubes are randomly or pseudo-randomly disposed.

In one preferred embodiment of the invention, the optical microphone further comprises a polarizer configured to polarize the light beam emitted from the light source.

In one preferred embodiment of the invention, the acoustic sensor further includes a base substrate on which the single-wall nanotubes are disposed. The nanotube axes of the single-wall nanotubes are perpendicular to the substrate surface.

For the preferred embodiments of the invention, the optical microphone advantageously further comprise a housing in which the light source, the acoustic sensor, and/or the detector, and/or the reflector, and/or the polarizer, and/or other supplementary microphone elements are contained. The housing preferably includes an inner wall and a protection element.

In one preferred embodiment of the invention, the inner wall of the housing is composed of single-wall nanotubes, which are preferably with non-metallic characteristics and in the form of a forest of aligned SWNTs. The protection element is disposed in proximity to the acoustic sensor for protecting the acoustic sensor from impurities.

Accordingly, a method for detecting acoustic pressure waves of this invention comprises: emitting a light beam; and using an acoustic sensor to reflect the emitted light beam. The acoustic sensor includes parallel-aligned single-wall nanotubes and deflects in response to pressure waves.

In one preferred embodiment, the method further comprises: using a reflector to re-reflect the light beam from the acoustic sensor; and detecting the re-reflected light beam from the reflector.

The optical microphone of the present invention detects acoustic pressure waves by using the acoustic sensor thereof. The acoustic sensor deflects when subjected to acoustic pressure waves and correspondingly reflects the light beam from the light source of the optical microphone. By detecting the reflected light beam with a detector, the acoustic pressure waves is detected and measured by the optical microphone. Since the acoustic sensor comprises nanotubes, the dimension of the acoustic sensor and thus the optical microphone become quite small which can thus be used in special conditions. Moreover, by re-reflecting the light beam using a reflector, a high reflection of the light beam can be achieved, and thus a refracted beam can be targeted on and detected by the optical detector. The measurements of the light beam and of the acoustic pressure waves are thus improved.

BRIEF DESCRIPTION OF THE DRAWINGS

For a better understanding the invention shall now be explained in more detail in the following description with reference to the figures. It is understood that the invention is not limited to this disclosed exemplary embodiments and that specified features can also expediently be combined and/or modified without departing from the scope of the present invention as defined in the appended claims.

DETAILED DESCRIPTION OF PREFERRED EMBODIMENTS

Figure 1:
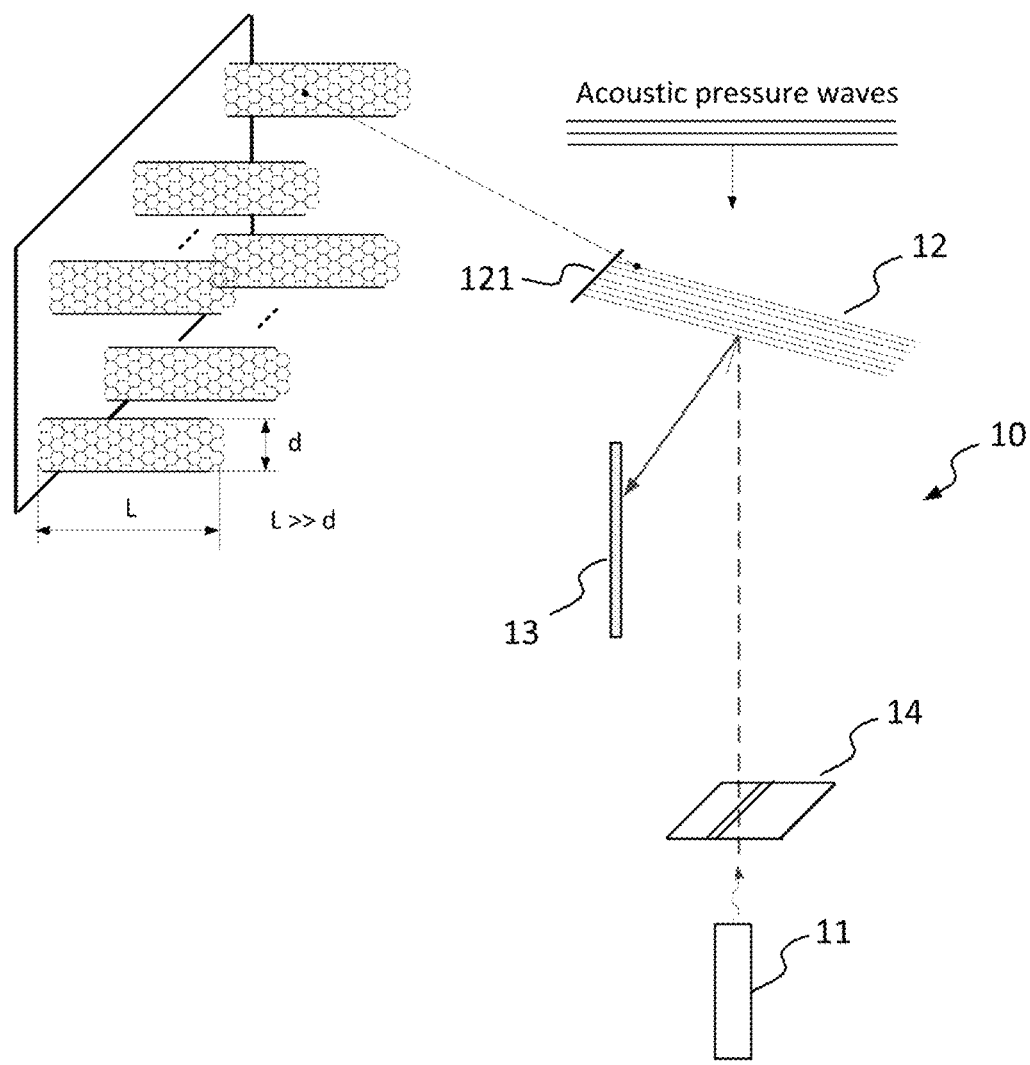
FIG. 1 is a schematic diagram illustrating one preferred embodiment of the optical microphone according to the present invention.

FIG. 1 shows an exemplary embodiment of an optical microphone according to the present invention. The optical microphone 10 comprises a light source 11 configured to emit a light beam, and an acoustic sensor 12 including parallel-aligned single-wall nanotubes (SWNTs). The acoustic sensor 12 deflects in response to pressure waves, e.g. acoustic pressure waves, and is configured to reflect the light beam emitted from the light source 11. The parallel-aligned SWNTs of the acoustic sensor 12 are disposed in a way that the nanotube axes of the SWNTs are parallel to each other. It is preferable that the SWNTs are particularly carbon nanotubes.

In addition, the optical microphone 12 comprises a detector 13 to detect the light beam reflected by the acoustic sensor 12. The detector 13 can be any kind of detector that is feasible and useful for optical detection.

Preferably, the light source 11 and the acoustic sensor 12 are correspondingly positioned such that the light beam from the light source 11 is illuminated onto the sidewalls of the SWNTs of the acoustic sensor 12. For example, as shown in FIG. 1, the light source 11 is positioned underneath the acoustic sensor 12 and emits a light beam upwards onto the sidewalls of the SWNTs of the acoustic sensor 12. However, it should be understood that the light source 11 and the acoustic sensor 12 can also be horizontally aligned or be positioned in any other proper configurations.

The optical microphone 10 of this invention is configured to detect acoustic pressure waves using the deflection of the acoustic sensor 12. Since the dimension of the acoustic sensor 12, which comprises mainly SWNTs, and thus the dimension of the whole optical microphone 10 are quite small, the acoustic pressure waves impinging on the optical microphone 10 with either higher or lower frequency can be considered as plane waves.

Figure 2:
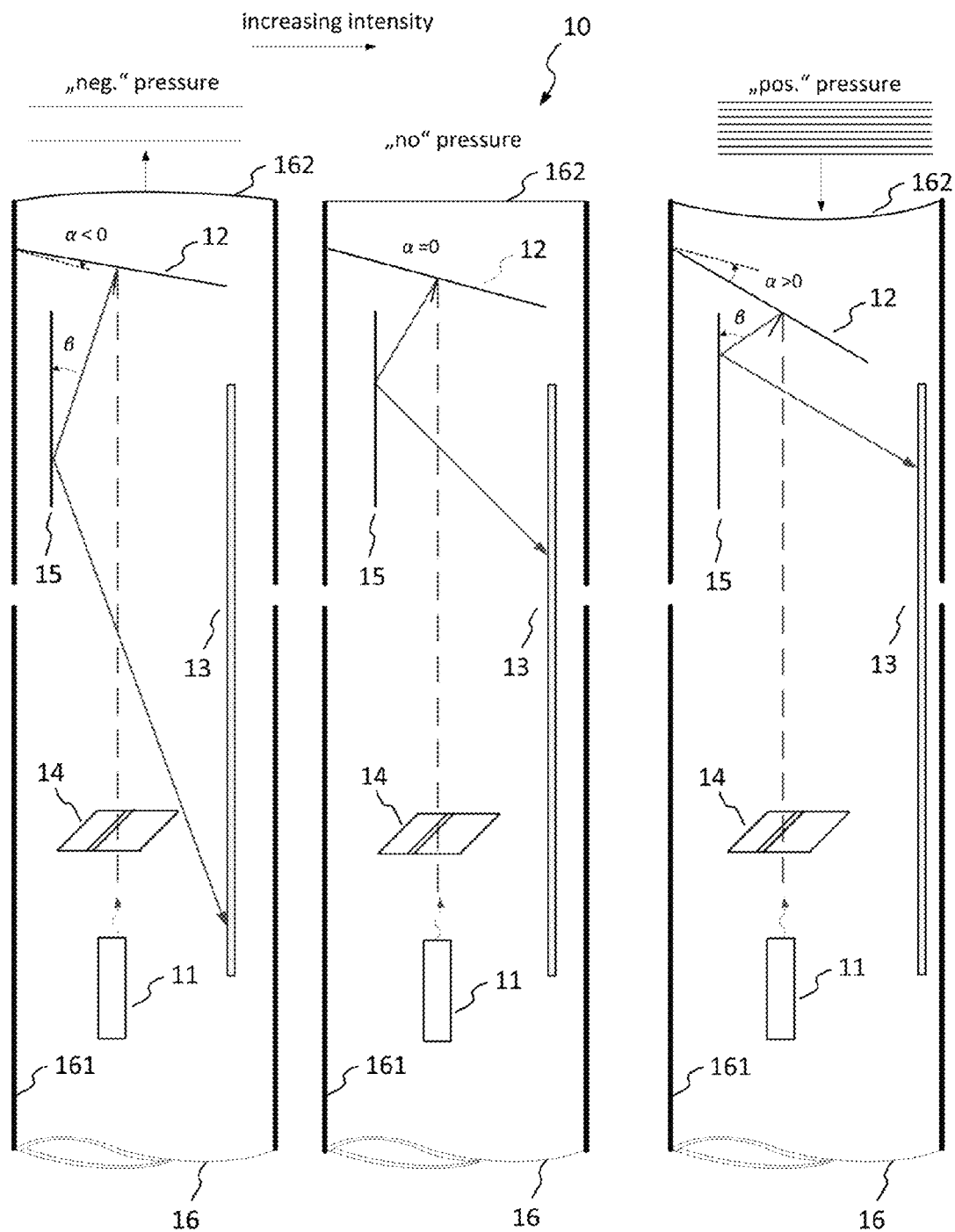
FIG. 2 is a schematic diagram illustrating another preferred embodiment of the optical microphone according to the present invention.

When the plane waves impinge on the SWNTs of the acoustic sensor 12, the SWNTs deflect differently according to the density and the direction of the plane waves due to a force of the waves on the SWNTs. The deflection of the SWNTs influences and changes the reflection of the light beam emitted from the light source 11, which is then detected by the detector 13. As shown in FIGS. 1 and 2, the reflection angle (e.g. the angle α) of the light beam is related and proportional to the deflection of the SWNTs, therefore the impinging acoustic pressure waves can be measured by the optical microphone 10.

Preferably, the SWNTs included in the acoustic sensor 12 are in the form of an array of parallel-aligned SWNTs. More preferably, the SWNTs of the SWNT array are isolated and separate from each other. The isolated SWNTs of the SWNT array respectively deflect when subjected to acoustic pressure waves and move back to their original position when the waves disappear. Since the SWNTs are not bundled, there is no Van-der-Waals force, and thus the SWNTs can resume their default condition when there is no external force from the pressure waves. More preferably, the SWNTs of the SWNT array are with a metallic characteristic, i.e., armchair chirality. Metallic SWNTs are known and useful for reflection of light for a broad spectrum. In this case, the isolation of the SWNTs with metallic characteristic can be achieved by mounting them onto a substrate with non-metallic characteristics.

Optionally, the light source 11 is a laser emitting a focused coherent light beam, and a polarizer 14 is positioned in front of the light source 11 to polarize the light beam emitted from the same. In [I], it is shown that optical absorption of SWNTs is strongly suppressed when the light polarization is perpendicular to the nanotube axis. Therefore, when using a laser beam with linear polarization orthogonal to the nanotube axes of the SWNTs of the acoustic sensor 12, a high reflection of the light beam can be achieved, which leads to an improved detection for the light beam and also the acoustic pressure waves. In this case, the Raman or Rayleigh (inelastic or elastic) scattering is also considered. In [II], the Raman and Rayleigh spectroscopic studies of SWNTs have demonstrated a strong polarization-dependence. Optionally, in order to achieve a further smaller dimension of the optical microphone, nanotubes activated indirectly via a single fiber can be used for the laser beam as a light source 11.

The acoustic sensor 12 can further include a base substrate 121, on which the SWNTs of the SWNT array are disposed. It is preferable that the nanotube axes of the SWNTs are perpendicular to the substrate surface, as shown in FIG. 1. More preferably, the base substrate 121 is non-metallic and is composed of material with low reflectivity, which can prevent the disturbance of detection and reflection of the light beam from the base substrate 121.

FIG. 2 shows another exemplary embodiment of the optical microphone according to this invention. This embodiment differs from the first embodiment in that the optical microphone 10 further comprises a reflector 15 configured to re-reflect the light beam from the acoustic sensor 12. The re-reflected light beam is subsequently detected by the detector 13. Of course, the configuration of the detector 13, the reflector 15 and other microphone elements can be flexible and different from the previous embodiment. Preferably, the reflector 15 includes multi-wall nanotubes (MWNTs). More preferably, the reflector 15 is a membrane reflector on which MWNTs are randomly or pseudo-randomly disposed. In [III], it is shown that randomly oriented MWNTs behave similar to a reflective mirror. The reflector 15 improves and enables a high reflection of the light beam so that the reflected light beam can be targeted on the detector 13, and thus the light beam and the acoustic pressure waves can be precisely analysed and measured.

As shown in FIG. 2, the acoustic sensor 12 deflects differently in response to various pressure waves and thus accordingly reflects the light beam. Since the reflection angles of the light beam for the first reflection and the re-reflection (e.g. the angles α and β) are related to each other, the shift of the light beam that corresponds indirectly to the acoustic pressure waves can be detected based on the intercept theorem. In addition, the reflector 15 can be designed to modify the light beam, e.g. the wavelength and/or the frequency thereof, while reflecting the same. By reflecting and modifying the light beam at the same time, the post-processing steps of the whole measurement procedure are simplified, and the costs thereof are thus reduced.

For another preferred embodiment of the optical microphone of this invention, the optical microphone 10 further comprises a housing 16 as shown in FIG. 2. The housing 16 is configured to contain therein the light source 11, the acoustic sensor 12, the detector 13, the optional polarizer 14 and reflector 15, and other supplementary elements of the optical microphone 10. For example, the exemplary housing 16 in FIG. 2 is a hollow cylindrical container.

Preferably, the housing 16 includes an inner wall 161 that prevents reflections for light beams with a large variety of incident angles and protects the microphone elements from impurities. In this way, noise for the detected light beam is reduced, and the detection and measurement of the light beam and thus the acoustic pressure waves are improved.

One embodiment of the inner wall 161 is composed of SWNTs, which are preferably with non-metallic characteristics and in the form of a forest of aligned SWNTs. It is shown in [I] that a forest of parallel-aligned non-metallic SWNTs behaves similarly to a black body if diffuse light shines in the direction of the nanotube axis. Accordingly, the non-metallic SWNTs of the inner wall 161 can prevent light reflection for a large variety of incident angles, thus reduces background noise and improve the detection of the acoustic pressure waves. A higher density of the non-metallic SWNTs of the inner wall 161 is preferable, which implies a better effect for preventing undesirable light reflection. The alignments of the non-metallic SWNTs relative to the inner wall 161 and/or other elements of the optical microphone 10 are flexible and adjustable, depending on the corresponding configuration of the light source 11, the acoustic sensor 12, etc. For example, in the embodiment shown in FIG. 2, the non-metallic SWNTs are preferably disposed on the inner wall 161 in an orientation such that the nanotube axes of the non-metallic SWNTs are perpendicular to the surface of the inner wall 161. In this way, the functions of the inner wall 161 for this embodiment are superior. Of course, the inner wall 161 can be composed of any other material that is suitable to be used in the optical microphone 10.

Optionally, the housing 16 includes a protection element 162 disposed in proximity to the acoustic sensor 12 for protecting the same from impurities. For example, the protection element 162 can be a membrane that is positioned on top or next to the acoustic sensor 12. Of course, the protection element 162 can be any kind of protector suitable to be used in an optical microphone, having various shapes such as rectangular or circular and being composed of suitable materials. The protection element 162 can be flexible and adjustable to fulfil different demands for the optical microphone 10. In addition, the protection element 162 can also be used to prevent other light beams coming from the outside of and shining through the optical microphone 10, which might disturb the main light beam inside the housing 16.

The above mentioned base substrate 121 of the acoustic sensor 12, on which the SWNTs of the SWNT array are disposed, can be optionally included or separate from the inner wall 161 of the housing 16. The base substrate 121 can be part of the inner wall 161 and can be manufactured together with the inner wall 161 during the manufacturing process. Alternatively, the base substrate 121 can be a separate element connected to or fixed on the inner wall 161 by any kind of suitable connecting methods.

Figure 3:
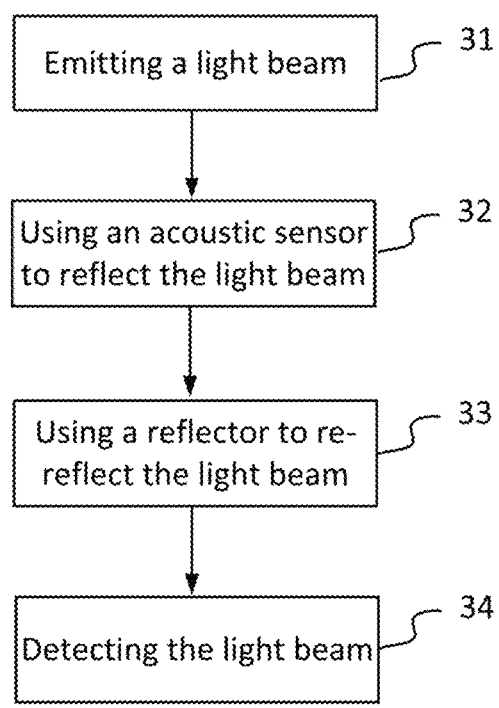
FIG. 3 is a flow chart illustrating one preferred embodiment of the method according to the present invention.

By using the exemplary optical microphone 10 of this invention, FIG. 3 shows a preferred embodiment of the method of this invention, which comprises: emitting 31 a light beam by the light source 11, and using 32 the acoustic sensor 12 including parallel-aligned single-wall nanotubes to reflect the emitted light beam. The above mentioned acoustic sensor 12 deflects in response to acoustic pressure waves. Optionally, the method further comprises: using 33 a reflector 15 to re-reflect the light beam from the acoustic sensor 12, and detecting 34 the re-reflected light beam from the reflector 15 by a detector 13.

When the optical microphone 10 is subjected to acoustic pressure waves, the acoustic sensor 12 thereof deflects in response to the waves and correspondingly reflects the light beam from the light source 11. By optionally re-reflecting and detecting the light beam, the optical microphone 10 of the present invention can precisely measure the acoustic pressure waves. Since the acoustic sensor comprises mainly nanotubes, the dimension of the optical microphone 10 is quite small, so that the acoustic sensor can be used on special conditions. For example, a microphone array where multiple sensors with very small dimensions are required. In addition, with the re-reflection of the light beam by the reflector 15, a higher SNR of the detection is achieved and thus the measurement result of the acoustic pressure waves is improved.

REFERENCES

[I] Kohei Mizuno, et al., "A black body absorber from vertically aligned single-walled carbon nanotubes", PNAS 2009, 106(15): 6044-6047.

[II] Ertugrul Cubukcu, et al., "Aligned carbon nanotubes as polarization-sensitive, molecular near-field detectors," PNAS 2009, 106(8): 2495-2499.

[III] T. Saleh, et al., "Transforming carbon nanotube forest from darkest absorber to reflective mirror", Appl. Phys. Lett. 101, 061913 (2012).

The invention claimed is:

1. An optical microphone, comprising:
a light source configured to emit a light beam, and
an acoustic sensor including single-wall nanotubes, wherein the acoustic sensor deflects in response to pressure waves and is configured to reflect the light beam emitted from the light source and impinged on the single-wall nanotubes.

2. The optical microphone of claim 1, further comprising a detector configured to detect the light beam reflected by the acoustic sensor.

3. The optical microphone of claim 1, further comprising a reflector including multi-wall nanotubes and configured to re-reflect the light beam from the acoustic sensor.

4. The optical microphone of claim 3, further comprising a detector configured to detect the light beam from the reflector.

5. The optical microphone of claim 3, wherein the reflector is a membrane reflector on which multi-wall nanotubes are randomly disposed.

6. The optical microphone of claim 1, wherein the light beam from the light source is illuminated onto the sidewalls of the single-wall nanotubes.

7. The optical microphone of claim 1, wherein the light source is a laser.

8. The optical microphone of claim 1, further comprising a polarizer configured to polarize the light beam emitted from the light source.

9. The optical microphone of claim 1, wherein the acoustic sensor further includes a base substrate, the single-wall nanotubes being disposed on the base substrate such that the nanotube axes of the single-wall nanotubes are perpendicular to the substrate surface.

10. The optical microphone of claim 1, further comprising a housing in which the light source and the acoustic sensor are contained.

11. The optical microphone of claim 10, wherein the housing includes an inner wall composed of single-wall nanotubes.

12. The optical microphone of claim 10, wherein the housing includes a protection element disposed in proximity to the acoustic sensor for protecting the acoustic sensor from impurities.

13. The optical microphone of claim 1, wherein the acoustic sensor includes parallel-aligned single-wall nanotubes.

14. The optical microphone of claim 13, wherein the acoustic sensor includes an array of parallel-aligned single-wall nanotubes.

15. A method for detecting acoustic pressure waves, comprising:
   emitting a light beam, and
   using an acoustic sensor including single-wall nanotubes to reflect the emitted light beam impinged on the single-wall nanotubes, wherein the acoustic sensor deflects in response to pressure waves.

16. The method of claim 15, further comprising:
   using a reflector to re-reflect the light beam from the acoustic sensor, and
   detecting the re-reflected light beam from the reflector.

17. The method of claim 15, wherein the acoustic sensor includes parallel-aligned single-wall nanotubes.

* * * * *